March 5, 1968  J. E. WEYAND ET AL  3,371,792

MULTIPLE FILTER PLATE UNITS

Filed March 21, 1966

INVENTORS
JOHN E. WEYAND
JOHN H. BUSH
PER L.F. FEYLING

BY *Pennie, Edmonds,*
*Morton, Taylor & Adams*
ATTORNEYS

United States Patent Office 3,371,792
Patented Mar. 5, 1968

3,371,792
MULTIPLE FILTER PLATE UNITS
John E. Weyand and John H. Bush, Needham, and Per L. F. Feyling, Belmont, Mass., assignors to Millipore Filter Corporation, Bedford, Mass., a corporation of Massachusetts
Filed Mar. 21, 1966, Ser. No. 535,945
8 Claims. (Cl. 210—335)

ABSTRACT OF THE DISCLOSURE

A filter plate unit including an inlet filter plate, an outlet filter plate, two intermediate filter plates arranged in stacked relationship with one of the intermediate plates positioned between the inlet plate and the outlet plate and the other intermediate at one end of the stack, and a pluraliy of filters, each of which is positioned between the adjacent filter plates.

---

This invention relates to filter plates of the type having inner and outer rings and means for passing liquid through filters supported on the rings, which filter plates may be arranged in any desired number within a case. The invention provides a unit consisting of four filter plates which may be stacked one unit over another and mounted in a case into which unfiltered liquid is forced and filtered liquid is removed.

Each unit consists of four filter plates each having an inner ring and an outer ring with flat parallel surfaces. Two of the filter plates are identical (hereinafter called the intermediate filter plate) having a perforated filter support secured to the opposite flat parallel surfaces and means between the filter supports for holding them in a flat position and having a groove for an O-ring on one side of both the inner and outer rings. One filter plate (hereinafter called the inlet filter plate) has a plurality of holes in the outer ring for introducing unfiltered liquid into the filter plate and the flat surfaces are recessed for securing perforated filter supports thereto, and have grooves in the recessed surfaces for a sealing means, and a support between the filter supports for holding the filter supports flat. The other filter plate (hereinafter called the outlet filter plate) has a plurality of holes in the inner ring for discharging filtered liquid. This filter plate also has parallel opposite flat surfaces on which perforated filter supports are secured and supporting means in the space between the perforated filter supports for holding the filter supports flat. The hollow space within the inner rings of the assembled unit provides an outlet duct for receiving the filtered liquid from the outlet filter plate and passing it out of the case.

The four filter plates of each unit are arranged with an intermediate filter plate over an outlet filter plate of the unit below, an inlet filter plate over the intermediate filter plate and another intermediate filter plate over the inlet filter plate. Then an outlet filter plate is placed over the intermediate filter plate. Each unit accordingly comprises an inlet filter plate between two intermediate filter plates. Each intermediate filter plate supports a final filter beneath an outlet filter plate. Since the filter supports on the inlet filter plate are on recessed surfaces of the rings this leaves a space between the filter supports of the inlet and intermediate filter plates and in an advantageous embodiment of the invention a prefilter is supported between these filter supports whereby the liquid can flow through the prefilters both ways into the spaces within the intermediate filter plates and through the final filters and be discharged through the holes in the outlet filter plate into the outlet duct.

In a preferred embodiment the inlet filter plate has grooves for sealing O-rings in the outer ring which bear on the overlying prefilter and the inner ring has grooves for O-rings which bear on and seal the filter supports of the intermediate filter plates but do not bear on the prefilter. In this embodiment we prefer to use a prefilter having a larger inner diameter than the O-ring of the inner ring which seals against the filter support so that the unfiltered liquid cannot bleed through the prefilter and enter the filtered liquid flowing through the duct. This feature is described and claimed in our copending patent application Ser. No. 535,946, filed Mar. 21, 1966.

Figure 1:
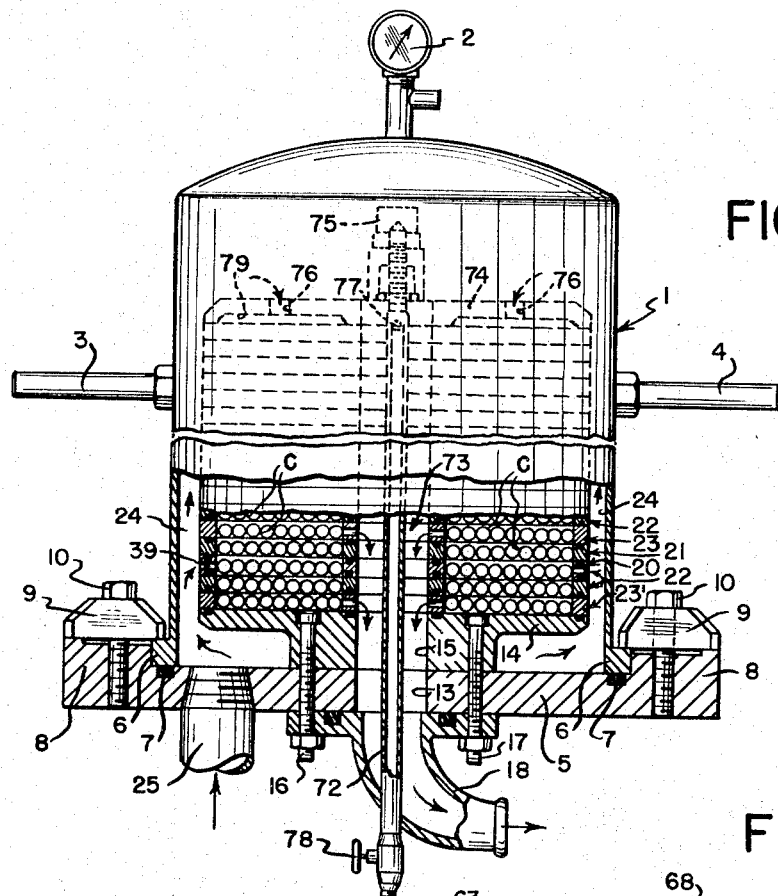
FIG. 1 is a side elevation, partly in section, of an assembly of units of filter plates of the invention.

FIG. 1 illustrates an assembly of units of filter plates of the invention stacked in a metal case 1 having a combination pressure gauge and relief valve 2 at the top and handles 3 and 4 for lifting the case off and placing it on its base 5. The case has an annular flange 6 resting on the sealing O-ring 7 and the base has an annular shoulder 8 for a plurality of clamps 9 which bear on the flange and press it into sealing contact with the O-rings on the base by means of bolts 10.

The center of the base has an opening 13 and the platform 14 having an opening 15 is secured to the base by bolts 16 and 17. The under surface of the base has a curved outlet fitting 18 secured thereto by the same bolts.

Several units of filter plates consisting of an inlet filter plate 20, intermediate filter plates 21 and 22 and outlet filter plate 23 are stacked in the case 1 on the platform 14. The outlet filter plate 23' is a filter plate of the unit below. The annular space 24 between the case 1 and the filter units provides the means for the passage of the unfiltered liquid which enters the space 24 through the supply pipe 25 into the inlet filter plates.

Figure 2:
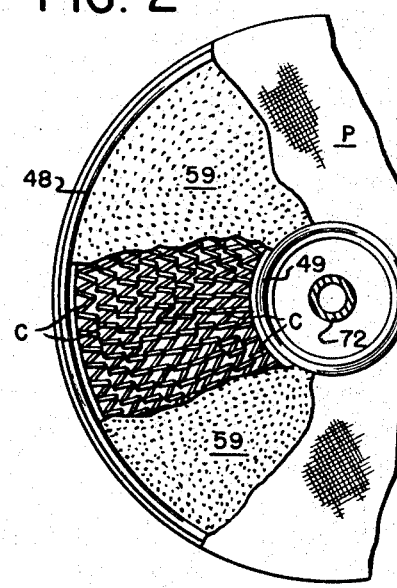
FIG. 2 is a plan view with parts removed illustrating the arrangement of filter supports and the means for supporting the filter supports.
Figure 3:
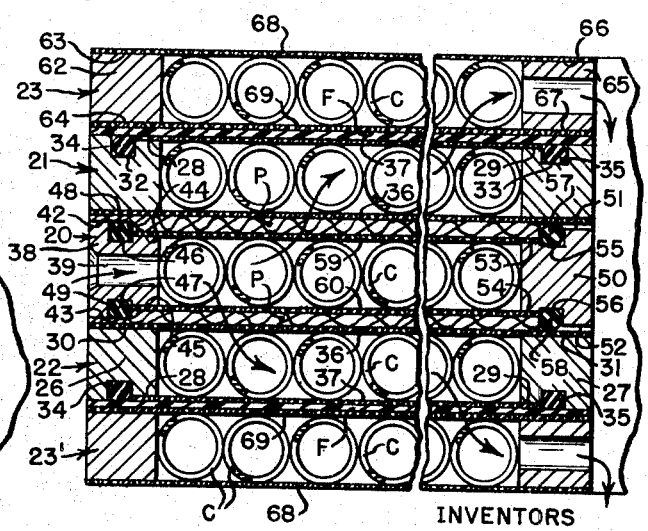
FIG. 3 is an enlarged sectional view of one-half of a filter plate unit of the invention.

As best shown in FIG. 3 the intermediate filter plates 21 and 22 are identical and only one will be described. The outer rings 26 and inner rings 27 have opposite flat parallel surfaces 28, 29 and 30, 31, grooves 32 and 33 and O-rings 34 and 35 respectively on which perforated filter supports 36 and 37 are secured as by welding. Within the space between the filter supports several concentric wire coils C are arranged which support the filter supports at a multiplicity of points as shown in FIG. 2. The copending patent application of John H. Bush, Ser. No. 418,428, filed Dec. 15, 1964, now Patent No. 3,306,-459, is directed to a filter plate having a perforated screen for supporting the filter which is supported at many points by several concentric coils of wire mounted in the plate under the perforated filter support, and this invention preferably employs such supporting coils of wire to support the perforated filter supports.

The inlet filter support 20 comprises an outer ring 38 having several radially disposed holes 39 for the entering unfiltered liquid, flat parallel surfaces 42 and 43, recessed flat parallel surfaces 44 and 45, and grooves 46 and 47 in which are inserted O-rings 48 and 49.

The inner ring 50 comprises two flat parallel surfaces 51 and 52, recessed flat parallel surfaces 53 and 54, and grooves 55 and 56 in which the O-rings 57 and 58 are inserted. Flat perforated filter supports 59 and 60 are secured to the flat recessed surfaces as by welding, and are supported by wire coils C as described above.

The outlet filter plate 23 has an outer ring 62 having opposite parallel flat surfaces 63 and 64, and the inner ring 65 also has opposite parallel flat surfaces 66 and 67. Two flat perforated filter supports 68 and 69 are secured to the flat parallel surfaces as by welding and are supported by wire coils C as described above.

In assembling the units of filter plates in a case as in FIG. 1, the case 1 is removed and an outlet filter plate 23' is placed on the platform 14 and a microporous plastic membrane filter F is placed over the support. Then an intermediate filter plate 22 is placed over the membrane filter and is sandwiched between the filter supports 60 and 69 with the O-rings 34 and 35 in sealing contact. Then a prefilter P which is relatively thick and formed of a material such as bonded glass fibers having an outer diameter the same as the outer diameter of the inlet rings and an inner diameter greater than the diameter of the O-ring 58 is placed over the filter support 36. The inlet filter plate 20 is then placed over the prefilter so that the O-ring 49 bears on the prefilter and the O-ring 58 bears on the perforated filter support 36. Another prefilter P is placed over the filter support 59 and O-ring 48, and another intermediate filter plate 21 is placed over the prefilter so that the perforated filter support 36 bears on the prefilter and on the O-ring 57. It will be noted that intermediate filter plate 21 is filter plate 22 turned over. This prefilter, like the first-mentioned prefilter, is not sealed by the O-ring 57 which is inside of the prefilter and is in sealing contact with the filter support 36. Another microporous plastic membrane filter F is placed over the porous filter support 37 and the outlet filter plate 23 is placed over the membrane filter so that the membrane filter is sandwiched between the filter supports 37 and 69 with the O-rings 34 and 35 bearing on the filter F. The filter unit, accordingly, consists of the four filter plates 20, 21, 22 and 23 together with their interposed filters and similar units may be stacked in any desired number as in FIG. 1. The case 1 is placed over the base 5 and the clamps 9 are pressed down with bolts 10 to bear on the flange 6 and press the flange into sealed contact with the O-rings on the base 5.

Then the hollow rod 72 is pushed up through the fitting 18, the central outlet duct 73, which is the hollow space inside the filter plates, and through the pressure plate 74 which is placed on top of the uppermost filter plate. Then the nut 75 is tightened to press all of the filter plates tightly together so that the O-rings effect proper sealing. The fitting 18 may be welded to rod 72 so that it can oppose the pressure tension due to nut 75. The pressure plate 74 has holes 76 to admit liquid and equalize pressure on the uppermost filter and to provide better drainage for the unit.

The rod 72 has a vent hole 77 to permit the escape of air in the initial filling of the case with liquid. After the air has been removed the valve 78 is closed.

The entire metal components are preferably made of stainless steel including the perforated filter supports which preferably have a multiplicity of holes having diameters, for example, of about 0.010 inch made preferably by a photoetching technique. Any suitable final filter may be used such as plastic membrane porous filters having pore sizes varying, say, from 0.01 to 14.0 microns which may constitute up to about 80 percent of the total volume of the filter. The prefilter may be of any suitable type, for example, a layer of glass fibers cemented together or glass fabrics together with other fibrous material. The pressure plate 74 has an annular groove 79 which receives liquid through holes 76 to equalize pressure on the uppermost filter plate.

We claim:

1. A filter plate unit comprising two intermediate filter plates each having inner and outer rings each having two opposite flat surfaces on which perforated filter supports are secured providing a space therebetween, means in the space supporting both filter supports; an inlet filter plate between the intermediate plates, said inlet filter plate having an outer ring with a plurality of holes for receiving unfiltered liquid and an inner ring, each ring having opposite flat surfaces and opposite recessed flat surfaces on which perforated filter supports are secured, sealing means between the inner and outer rings of the inlet filter plate and the filter support of the intermediate filter plate, means in the space between the perforated filter supports of the inlet filter plate to support both filter supports; an outlet filter plate having an outer ring with opposite flat surfaces, an inner ring with opposithe flat surfaces and a plurality of holes for discharging filtered liquid, a perforated filter support secured on the opposite flat surfaces with a space therebetween, means in the space to support both filter supports, said filter plates being constructed and arranged to receive a final filter between an outlet filter plate and one intermediate filter plate, a prefilter between the inlet filter plate and the one intermediate filter plate, another prefilter between the inlet filter plate and the other intermediate filter plate, and another final filter between the last-mentioned intermediate filter plate and the outlet filter plate of the next unit.

2. A stack of units of filter plates as defined in claim 1 in which the intermediate filter plate of one unit rests on an outlet filter plate of the unit below and a final filter is interposed.

3. A stack of units of filter plates as defined in claim 1 in which the filter supports for the final filters have a multiplicity of holes about 0.010 inch in diameter and are held uniformly flat by a support providing a multiplicity of support points.

4. A unit for filtering liquids comprising four filter plates consisting of an outlet filter plate having inner and outer rings with a support for a filter secured to both opposite sides thereof and one of the rings having holes therethrough, for passing filtered liquid out of the outlet filter plate, an intermediate filter plate having inner and outer rings with filter supports on both opposite sides mounted over the outlet filter plate, means for securing in sealed contact a final filter between the filter supports of the outlet filter plate and the intermediate filter plate, an inlet filter plate having inner and outer rings with filter supports on the opposite sides thereof, said inlet filter plate being mounted over the intermediate filter plate and having holes in the ring thereof corresponding to the other ring of said outlet filter plate for passing unfiltered liquid into the inlet filter plate, means for securing a prefilter between the supports on the inlet filter plate and the intermediate filter plate, and another intermediate filter plate mounted over the inlet filter plate so as to receive another prefilter therebetween, said last-mentioned intermediate filter plate being the uppermost of the unit and arranged to have thereover the outlet filter plate of the next unit with a final filter therebetween.

5. A unit as defined in claim 4 which comprises sealing means between each filter plate and the filter plate above.

6. A plurality of filter plates each having inner and outer rings and parallel spaced apart perforated filter supports extending between the rings on opposite sides thereof, means between the supports to hold the supports uniformly flat, one filter plate being an inlet plate having holes in one of the rings thereof for introducing unfiltered liquid into the space, a prefilter over each support of the inlet filter plate through which the liquid is passed, two of the filter plates being intermediate filter plates one of which is over the inlet filter plate and one of which is under the inlet filter plate each having a filter support on a prefilter, one of said filter plates being an outlet filter plate having holes in the ring thereof corresponding to the other ring of said inlet plate for discharging filtered liquid mounted over the uppermost intermediate filter plate, a final filter interposed between the outlet filter plate and the intermediate filter plate, and sealing means between the filter plates.

7. A plurality of filter plates as defined in claim 6 in which the final filter is a plastic membrane porous filter having pore sizes varying from 0.01 to 14.0 microns.

8. A plurality of filter plates as defined in claim 6 stacked within a surrounding case, a space between the case and the stack for passing unfiltered liquid into the holes of the inlet filter plate, said holes being in the outer ring of said inlet filter plate a hollow space inside the stack of filter plates, the holes in the outlet filter plates being in the inner ring thereof and entering the hollow space, whereby liquid which passes through the final filters passes through the holes in the outlet filter plate and is discharged through the hollow space.

References Cited

UNITED STATES PATENTS

| | | | |
|---|---|---|---|
| 367,212 | 7/1887 | Klein | 210—343 |
| 3,306,459 | 2/1967 | Bush | 210—345 X |

SAMIH N. ZAHARNA, *Primary Examiner.*

REUBEN FRIEDMAN, *Examiner.*

F. SPEAR, *Assistant Examiner.*